US006245266B1

(12) United States Patent
Ramesh et al.

(10) Patent No.: US 6,245,266 B1
(45) Date of Patent: Jun. 12, 2001

(54) METHOD FOR MAKING ORIENTED POLYETHYLENE FOAM AND FOAM PRODUCED THEREBY

(75) Inventors: Natarajan S. Ramesh, Danbury, CT (US); Lloyd George, Barnstable, MA (US)

(73) Assignee: Sealed Air Corp. (US), Saddlebrook, NJ (US)

( * ) Notice: Subject to any disclaimer, the term of this patent is extended or adjusted under 35 U.S.C. 154(b) by 0 days.

(21) Appl. No.: 09/268,396

(22) Filed: Mar. 15, 1999

(51) Int. Cl.[7] ........................................ C08J 9/00
(52) U.S. Cl. .................. 264/51; 264/53; 521/79; 521/142; 521/143
(58) Field of Search ............................ 521/79, 142, 143; 264/51, 53

(56) References Cited

U.S. PATENT DOCUMENTS

| | | | |
|---|---|---|---|
| 3,523,988 | 8/1970 | Roehr et al. | 264/41 |
| 3,932,569 | 1/1976 | Fuss | 264/51 |
| 4,272,468 | 6/1981 | Slocumb | 264/53 |
| 4,387,169 | 6/1983 | Zabrocki et al. | 521/79 |
| 4,426,065 * | 1/1984 | Komatsuzaki et al. | 264/45.9 |
| 4,562,022 | 12/1985 | Li et al. | 264/54 |
| 4,649,001 | 3/1987 | Nakamura et al. | 264/50 |
| 4,753,762 | 6/1988 | Li et al. | 264/54 |
| 5,059,631 | 10/1991 | Hovis et al. | 521/79 |
| 5,098,782 | 3/1992 | Hovis et al. | 428/314 |
| 5,116,881 | 5/1992 | Park et al. | 521/143 |
| 5,180,751 | 1/1993 | Park et al. | 521/51 |
| 5,234,652 | 8/1993 | Woodhams et al. | 264/210 |
| 5,348,984 | 9/1994 | Lee | 521/79 |
| 5,362,436 * | 11/1994 | Wagner | 264/321 |
| 5,653,923 | 8/1997 | Spoo et al. | 264/46 |
| 5,776,389 | 7/1998 | Chaudhary | 264/50 |

FOREIGN PATENT DOCUMENTS

| | | |
|---|---|---|
| 1114152 | 5/1968 | (EP) . |
| 10-70973 | 8/1996 | (JP) . |

* cited by examiner

*Primary Examiner*—Morton Foelak
(74) *Attorney, Agent, or Firm*—Thomas C. Lagaly

(57) ABSTRACT

A method for making an oriented foam generally includes the steps of:
  a. blending molten polyethylene and a blowing agent to form a foamable mixture;
  b. producing a foam by extruding the mixture at a predetermined rate through a die and into a region of reduced pressure so that the blowing agent expands within the mixture; and
  c. orienting the foam by drawing the foam out of the die at a rate that is between 1 and 1.5 times greater than the predetermined rate at which the mixture is extruded.

11 Claims, No Drawings

METHOD FOR MAKING ORIENTED POLYETHYLENE FOAM AND FOAM PRODUCED THEREBY

BACKGROUND OF THE INVENTION

The present invention relates generally to polyolefin foams and, more particularly, to extruded and oriented foam sheets comprising polyethylene.

Polyethylene foam sheets and methods for manufacturing polyethylene foam sheets are well known in the art. See, e.g., U.S. Pat. Nos. 5,348,984 (Lee), 5,462,974 (Lee), and 5,667,728 (Lee), the disclosures of which are incorporated herein by reference thereto. One of the most common polyethylenes used is low density polyethylene (LDPE). While LDPE possesses a number of beneficial physical and chemical properties when used to produce a foamed sheet, a disadvantage of LDPE is that extruded foam sheets made therefrom have a flexural modulus that is lower than would otherwise be desired for certain applications.

One method that has been proposed for improving the tensile strength, cushioning performance, and flexibility of extruded foams formed from a food product starting material is disclosed in JP 10-70973, which proposes that such foams be stretched immediately after extrusion at a take-off rate that is from 1.5 to 3 times higher than the extrusion rate.

The inventors hereof have found, however, that in the production of polyethylene foam sheets, a take-off rate/extrusion rate ratio (hereinafter referred to as a "draw ratio") ranging from 1.5 to 3 as taught in JP 10-70973 detrimentally reduces the dimensional uniformity of the resultant foam sheet. Such non-uniformity was most prominently manifested in the thickness dimension of the foam sheet, with a high degree of variation in the thickness of the foam occurring when the draw ratio was increased above 1.5. Such variation presents a poor aesthetic appearance and surface feel and, more significantly, indicates that the mechanical properties of the foam (strength, flexibility, etc.) are non-uniformly distributed throughout the foam. Any polyethylene foam sheets made in accordance with JP 10-70973 would therefore be commercially unacceptable.

Accordingly, a need exists in the art for a process of making polyethylene foam sheet having improved flexural modulus but with a low degree of variation in the thickness of such foam.

SUMMARY OF THE INVENTION

That need is met by the present invention, which provides a method for making an oriented foam, comprising the steps of:
 a. blending molten polyethylene and a blowing agent to form a foamable mixture;
 b. producing a foam by extruding the mixture at a predetermined rate through a die and into a region of reduced pressure so that the blowing agent expands within the mixture; and
 c. orienting the foam by drawing the foam out of the die at a rate that is between 1 and 1.5 times greater than the predetermined rate at which the mixture is extruded.

By orienting polyethylene foam sheet at a draw ratio of less than 1.5 in accordance with the method of the present invention, the resultant foam sheet has been found to exhibit dramatic increases in stiffness with minimal thickness variation, typically less than 5% variation in thickness, which results in commercially acceptable foams that are both aesthetically and structurally superior to both non-oriented foams and foams oriented at a draw ratio greater than 1.5.

In accordance with another aspect of the present invention, an oriented foam sheet is formed from a foamable mixture comprising polyethylene having a density of less than about 0.921 g/cc, the foam sheet having an orientation ratio between 1 and 1.5 and having been foamed at a temperature ranging from about 0.5 to about 2° F. above the crystallization temperature of the foamable mixture. Such foams foam provides excellent stiffness and minimal thickness variation, along with economic and processing advantages associated with the employment of lower density LDPE resin as described in further detail below.

DETAILED DESCRIPTION OF THE INVENTION

In accordance with the present invention, a method for making an oriented foam comprises the steps of:
 a. blending molten polyethylene and a blowing agent to form a foamable mixture;
 b. producing a foam by extruding the mixture at a predetermined rate through a die and into a region of reduced pressure so that the blowing agent expands within the mixture; and
 c. orienting the foam by drawing the foam out of the die at a rate that is between 1 and 1.5 times greater than the predetermined rate at which the mixture is extruded.

Preferably, the polyethylene comprises at least one member selected from the group consisting of low density polyethylene, high density polyethylene, and ethylene/alpha-olefin copolymer. More preferably, the polyethylene comprises low density polyethylene (LDPE).

Any LDPE may be used in accordance with the present invention. Preferably, the LDPE has a density ranging from about 0.91 to about 0.93 g/cc, a crystallinity ranging from about 10% to about 55%, and a softening point (DSC melt peak) ranging from about 95° C. to about 130° C. More preferably, the density ranges from about 0.91 to about 0.925 g/cc, the crystallinity ranges from about 20% to about 50%, and the softening point ranges from about 104° C. to about 115° C. The melt index (MI) of the LDPE may range from 0.1 to over 50 g/10 min. but preferably ranges from about 0.3 to about 10 g/10 min. More preferably, the MI ranges from about 1 to 5 g/10 min.

The ethylene/alpha-olefin copolymer can be heterogeneous (Ziegler-Natta catalyzed) or homogeneous (metallocene (single-site) catalyzed) as desired, and may have a density ranging from about 0.89 to about 0.91 g/cc.

The density of the polyethylene resin is preferably as low as possible. Relative to a higher density resin, a lower density resins is generally easier and less expensive to process in that they require less power from the processing equipment, primarily the extruders, and also require lower processing temperatures. In addition, lower density resins allow for a wider range of processing temperatures (exit die temperatures) within which good, commercial quality foams can be made. Thus, in general, the higher the density of the resin, more difficult and expensive it is to process foams and the narrower the processing temperature window is within which quality foams can be made.

One drawback to using a lower density resin in the manufacture of polyethylene foams is that foam stiffness generally decreases with decreasing resin density. However, the inventors have surprisingly discovered that foams made with lower density polyethylene resins in accordance with the present invention, i.e., formed at a draw ratio ranging from 1 to 1.5, have comparable stiffnesses to foams made with higher density resins. Specifically, in the case of LDPE, while a resin of any density can be used as noted above, the density of the LDPE resin is preferably less than 0.925 g/cc, more preferably less than 0.923, more preferably still less than 0.921, and most preferably less than 0.920 g/cc. As shown in the Examples below, foams made in accordance with the invention with a LDPE resin having a density of 0.918 g/cc have a stiffness that compares favorably with foams made with a LDPE resin having a density of 0.925 g/cc.

Any conventional chemical or physical blowing agents may be used. Preferably, the blowing agent is a physical blowing agent such as nitrogen, argon, carbon dioxide, methane, ethane, propane, butanes (e.g., n-butane or isobutane), pentanes, hexanes, butadiene, acetone, methylene chloride, any of the chlorofluorocarbons, hydrochlorofluorocarbons, halogenated hydrocarbon blowing agents, hydrofluorocarbons, alcohols, ketones, ethers, or aromatic hydrocarbons, as well as mixtures of the foregoing.

The blowing agent may be mixed with the polyethylene in any desired amount to achieve a desired degree of expansion in the resultant foam. Generally, the blowing agent may be added to the polyethylene in an amount ranging from about 0.5 to 80 parts by weight, based on 100 parts by weight of the polyethylene. More preferably, the blowing agent is present in an amount ranging from 1 to 30 and, most preferably, from 2 to 15 parts per 100 parts by weight of the polyethylene.

If desired or necessary, various additives may also be included with the polyethylene. For example, it may be desirable to include a nucleating agent (e.g., sodium salts of carbonic acids, carbonate compounds such as sodium or calcium carbonate, sodium citrate, polycarboxylic acids, zinc oxide, zirconium oxide, silica, silicates, talc, clay, diatomaceous earth etc.) and/or an aging modifier (e.g., a fatty acid ester, a fatty acid primary amide, a fatty acid alkanolamide, etc.). Other additives that may be included if desired are pigments, colorants, fillers, antioxidants, flame retardants, stabilizers, fragrances, odor masking agents, and the like.

Foam in accordance with the present invention is preferably made by an extrusion process as is well known in the art. In such a process, the polyethylene is added to an extruder, preferably in the form of resin pellets. Any conventional type of extruder may be used, e.g., a single screw, double screw, and/or tandem extruder. In the extruder, the resin pellets are melted and mixed. The blowing agent is preferably added to the melted polyethylene via one or more injection ports in the extruder. Any additives that are used may be added to the melted polyethylene in the extruder and/or may be added with the resin pellets. The extruder pushes the entire melted, foamable mixture (melted polyethylene, blowing agent, and any additives) through a die at the end of the extruder and into a region of reduced temperature and pressure (relative to the temperature and pressure within the extruder). Typically, the region of reduced temperature and pressure is the ambient atmosphere. The sudden reduction in pressure causes the blowing agent to expand into cells that solidify upon cooling of the polymer mass (due to the reduction in temperature), thereby trapping the blowing agent within the cells. Dies having either an annular or flat (slotted) opening are typically used. For foam sheets having a thickness of about 0.5 inches or more, the foam is preferably "cast" from a die with a flat/slotted opening.

In accordance with the practice of the present invention, the polyethylene foam is oriented in the machine direction, i.e., the direction in which the foam is extruded, in order to increase the flexural modulus (stiffness) of the foam. The foam is oriented by drawing the foam out of the die at a rate that is between 1 and 1.5 times greater than the rate at which the foamable mixture is extruded, i.e., at a draw ratio that is greater than 1 and less than 1.5. This results in a foam with an orientation ratio ranging from 1 to less than 1.5. Preferably, the draw ratio ranges from about 1.1 to about 1.45; more preferably from about 1.15 to about 1.4; and most preferably from about 1.15 to about 1.35. The foam can be drawn in this manner in a number of different ways. For example, the extruded foam can be passed through a pair of nip rollers or belts rotating in opposite directions from one another but with their respective surfaces that are in contact with the foam moving in the same direction as the foam is extruded. By causing the surfaces of the rollers or belts to move the foam forward at a speed that exceeds the rate at which the foam is extruded, the foam is stretched as it exits the die, with the speed of the nip rollers or belts controlling the extent to which the foam is oriented. That is, the greater the speed of the nip rollers or belts, the greater will be the degree of foam stretch and orientation.

As an alternative to using two rollers or belts, since a draw ratio of less than 1.5 is employed in accordance with the practice of the present invention, it is possible to use only a single belt to stretch the foam. In this case, a surface of the belt moving in the direction of extrusion is brought into contact with one surface of the foam as it exits the die, thereby drawing the foam from the die faster than the rate of extrusion due to the frictional contact between the belt and the foam.

As a result of the stretching or drawing process as described above, the cell walls of the foam, which are normally oriented as a result of expansion by the blowing agent, undergo additional orientation in the machine direction. This has been found to enhance the flexural modulus (stiffness) of the foam in the machine direction without decreasing stiffness in the transverse direction.

It has surprisingly been determined that substantial increases in foam stiffness can be achieved in foams made from polyethylene when such foams are produced with a draw ratio between 1 and 1.5. As shown in the Examples below, increases in stiffness of up to about 50% can be realized as a result of orienting the foam at a draw ratio between 1 and 1.5. At the same time, by orienting the foams at a draw ratio that is less than 1.5, any variation in foam thickness caused by the orientation is sufficiently minimal that the resultant foams are commercially acceptable from both a structural and an aesthetic standpoint. The inventor has determined that an optimum balance between increased stiffness and minimal thickness variation occurs when the draw ratio is between about 1.15 and 1.35.

In general, polyethylene foams having greater than a 5% variation in thickness are commercially unacceptable as being both structurally and aesthetically deficient. Advantageously, foams made in accordance with the present invention have been found to have less than 5% variation in the thickness of the foam sheet. More preferably, such foams have less than 4% variation, even more preferably less than 3% variation, and most preferably less than 2% variation in thickness.

In accordance with another aspect of the present invention, it has been determined that the balance between increased stiffness with minimal thickness variation can be further optimized by controlling the temperature of the foamable mixture (polyethylene, blowing agent, and any additives) so that, as it is extruded through the die, the temperature ("foaming temperature") of the foamable mixture ranges from about 0.5 to about 2° F. above the crystallization temperature of the foamable mixture. As used herein, the term "crystallization temperature" refers to the temperature of a mixture comprising one or more polymers, one or more blowing agents and, optionally one or more additives, below which the onset of crystallization occurs in such mixture. In other words, at a temperature below the crystallization temperature, polymer crystals begin to form in the mixture.

The crystallization temperature of the foamable mixture varies with the change in concentration of blowing agents, additives and polyethylene resin density. In general, the crystallization temperature determines the solidification rate of the polyethylene foam. The higher the foaming temperature of the polymer/blowing agent mixture is above the crystallization temperature, the slower will be the solidification (crystallization) rate, thereby resulting in less net molecular orientation of polymer molecules, and therefore relatively lower stiffness, than a foam having greater orientation due to more rapid solidification.

The inventors have determined that maximal stiffness increases could be achieved with minimal stretching (i.e., a draw ratio less than 1.5), and therefore with minimal thickness variation in the resultant foam, when the foaming temperature of a polyethylene foamable mixture is maintained within about 0.5 to about 2° F. above the crystallization temperature of the foamable mixture.

The oriented foam sheet produced by the foregoing method in accordance with the claimed invention is preferably in the form of an extruded foam sheet. As such, the sheet may have any desired thickness ranging, e.g., from about 0.5 to about 10 centimeters. Foam sheets having such a thickness are often termed 'planks' or 'boards.' The foam may having any desired width ranging, e.g., from about 10 to about 125 centimeters. The density of the foam may range, e.g., from about 10 to about 160 kg/m³.

These and other aspects and advantages of the invention may be further understood by reference to the following examples, which are provided for illustrative purposes only and are not intended in any way to be limiting.

EXAMPLES

In each of the following examples, cast foam planks (i.e., foam sheets having a rectangular cross-section) comprising LDPE were made using butane as a blowing agent. The following terms are used in the tables below and are defined as follows:

"Foaming Temperature" is the processing (actual) temperature of the polymer melt as measured at the exit of the die;

"Flexural Modulus" is a measure of the stiffness of the foam in the machine direction, and is determined in accordance with modified ASTM Method D790;

"% Increase in Stiffness" is determined by subtracting the flexural modulus of control (unstretched) foam from the flexural modulus of the stretched foam (draw ratio >1), and dividing the difference by the flexural modulus of control foam; and "% Variation in Foam Thickness" is determined by taking 5 separate measurements of the thickness of a foam plank along a cross-section of the plank to determine an average thickness of the foam, subtracting the minimum value of the 5 measured thicknesses from the maximum value, and then dividing the difference by the average thickness of the foam.

Example 1

A primary single screw melting extruder and a secondary (downstream) single screw melting extruder, both having a length/diameter ratios of approximately 30:1, were used in tandem to extrude a mixture of 467 kilograms/hour LDPE having a MI of 2 g/10 min. and a density of 0.925 g/cm³, 6.4 wt. % butane blowing agent, 0.94 wt. % aging modifier (glycerol monostearate), and 0.3 wt. % nucleating agent (mixture of sodium salt of polycarbonic acid and sodium carbonate) to produce LDPE foam plank having a density of 2.4 pounds/ft³. Each of the foregoing weight percentages are based on the mass flow rate of LDPE (i.e., with the mass flow rate of LDPE being 100%). Key processing and product parameters are listed below in Table 1.

TABLE 1

| Run | Foaming Temp. (° F.) | Extrusion Rate (ER), fpm | Take-off Rate (TR), fpm | Draw Ratio = TR/ER | Flexural Modulus (psi) | % Increase in Stiffness |
|---|---|---|---|---|---|---|
| Control Run (Unstretched) | 238.1 | 13.5 | 13.5 | 1 | 306 | 0% |
| Run #1 | 238.1 | 13.5 | 15.5 | 1.15 | 341 | 11.4% |
| Run #2 | 238.1 | 13.5 | 17.25 | 1.28 | 407 | 33% |
| Run #3 | 238.1 | 13.5 | 20 | 1.48 | 445 | 45.4% |
| Run #4 (Comparative) | 238.1 | 13.5 | 23 | 1.70 | 496 | 62.1% | fpm = feet per minute

As shown, foam stiffness was found to increase with increasing draw ratio, i.e., orientation.

Foam stiffness in the transverse direction (i.e., perpendicular to the machine direction) was not decreased due to orientation in the machine direction.

The foam planks produced in each of the runs set forth in Table 1 were measured for width, average thickness, and % variation in foam thickness. The results are summarized in Table 2:

TABLE 2

| Run | Draw Ratio | Plank Width (inches) | Average Plank Thickness (inches) | % Variation in Foam Thickness |
|---|---|---|---|---|
| Control Run (Unstretched) | 1.0 | 30.875 | 2.375 | 0.3% |
| Run #1 | 1.15 | 30.75 | 2.25 | 0.33% |
| Run #2 | 1.28 | 26.75 | 2.25 | 0.4% |
| Run #3 | 1.48 | 26.00 | 2.00 | 1.2% |
| Run #4 (Comparative) | 1.70 | 25.80 | 2.129 | 8.4% |

While the width and thickness generally decreased with increasing draw ratio as might be expected, the thickness variation increased sharply when the draw ratio was increased to greater than 1.5.

Example 2

A counter-rotating twin screw extruder having a length/diameter ratios of approximately 30:1 was used to extrude a mixture of 409 kilograms/hour LDPE having a MI of 2 and a density of 0.919 g/cm³, 6.4 wt. % butane blowing agent, 1.6 wt. % aging modifier (glycerol monostearate), and 1.6 wt. % nucleating agent (talc masterbatch with 50% loading of talc with LDPE carrier) to produce LDPE foam plank having a density of 2.4 pounds/ft³. Each of the foregoing weight percentages are based on the mass flow rate of LDPE. Key processing and product parameters are listed below in Table 3.

TABLE 3

| Foam | Foaming Temp. (° F.) | Extrusion Rate (ER), fpm | Take-off Rate (TR), fpm | Draw Ratio = TR/ER | Flexural Modulus (psi) | % Increase in Stiffness |
|---|---|---|---|---|---|---|
| Control (Un-stretched) | 231.5 | 15.8 | 15.8 | 1.0 | 276.9 | 0% |
| Example 2 | 231.5 | 15.8 | 19.1 | 1.21 | 394.9 | 42% |

Example 3

A tandem extruder system as in Example 1 was used to extrude a mixture of 458 kilograms/hour LDPE having a MI of 2 and a density of 0.919 g/cm$^3$, 6.4 wt. % butane blowing agent, 0.9 wt. % aging modifier (glycerol monostearate), and 0.3 wt. % nucleating agent (a mixture of sodium salt of polycarbonic acid and sodium carbonate) to produce LDPE foam plank having a density of 2.4 pounds/ft$^3$. Each of the foregoing weight percentages are based on the mass flow rate of LDPE. Key processing and product parameters are listed below in Table 4.

TABLE 4

| Foam | Foaming Temp. (° F.) | Extrusion Rate (ER), fpm | Take-off Rate (TR), fpm | Draw Ratio = TR/ER | Flexural Modulus (psi) | % Increase in Stiffness |
|---|---|---|---|---|---|---|
| Control (Un-stretched) | 234.6 | 10.5 | 10.5 | 1.0 | 264 | 0% |
| Example 3 | 234.6 | 10.5 | 15.3 | 1.46 | 352 | 33% |

Example 4

A tandem extruder as in Example 1 was used to extrude a mixture of 417 kilograms/hour LDPE having a MI of 2 and a density of 0.919 g/cm$^3$, 6.4 wt. % butane blowing agent, 0.9 wt. % aging modifier (glycerol monostearate), and 0.3 wt. % nucleating agent (a mixture of sodium salt of polycarbonic acid and sodium carbonate) to produce LDPE foam plank having a density of 2.4 pounds/ft$^3$. Each of the foregoing weight percentages are based on the mass of LDPE. Key processing and product parameters are listed below in Table 5.

TABLE 5

| Foam | Foaming Temp. (° F.) | Extrusion Rate (ER), fpm | Take-off Rate (TR), fpm | Draw Ratio = TR/ER | Flexural Modulus (psi) | % Increase in Stiffness |
|---|---|---|---|---|---|---|
| Control (Un-stretched) | 230.6 | 15 | 15 | 1.0 | 262 | 0% |
| Example 4 (Comparative) | 230.6 | 15 | 30 | 2.0 | 436 | 65% |

In comparing the results from Tables 3–5, it can be seen that, in general, foam stiffness increases with increasing draw ratio. An exception to this is the foam of Example 2, with a draw ratio of 1.21 and an stiffness increase of 42%, verses the foam of Example 3 having a higher draw ratio of 1.46 but a lower stiffness increase of 33%. The reason for this decrease in performance is believed due to the fact that the foaming temperature in Example 3 (234.6° F.) was higher than that of Example 2 (231.5° F.), and therefore farther above the crystallization temperature of the polymeric mixture. For the polymer-blowing agent mixture at the extruder conditions of Examples 2 and 3, the crystallization temperature was 230° F. Thus, the foam of Example 2 was foamed within the preferred range of 0.5 to 2° F. above the crystallization temperature (i.e., 1.5° F. above the crystallization temp.) while the foam of Example 3 was foamed outside of this range (i.e., 4.6° F. higher than the crystallization temp.). As a result, the foam in Example 3 was not oriented to the same degree as the foam of Example 2, and therefore not as stiff even though the draw ratio was higher.

The oriented foam planks produced in Examples 2–4 were measured for width, average thickness, and % variation in foam thickness. The results are summarized in Table 6:

TABLE 6

| Foam | Draw Ratio | Plank Width (inches) | Average Plank Thickness (inches) | % Variation in Foam Thickness |
|---|---|---|---|---|
| Example 2 | 1.21 | 30 | 2.25 | 0.6% |
| Example 3 | 1.46 | 30.75 | 2.25 | 2.16% |
| Example 4 (Comparative) | 2.0 | 25 | 1.58 | 7.5% |

As discussed above, a foam having a thickness variation of greater than 5% is considered commercially unacceptable. Being considerably less than 5%, the thickness variation in the foams of Examples 2 and 3 indicate that both foams are commercially acceptable, with the foam of Example 2 exhibiting particularly good thickness uniformity. However, when the draw ratio was increased above 1.46 to 2.0 in the foam of Comparative Example 4, the thickness variation increased sharply to an unacceptable 7.5%.

As noted hereinabove, foams are preferably made from LDPE resin having a density of less than about 0.921 g/cc. Such lower density resin is easier to process and more economical (less energy usage) than a higher density LDPE resin. In the past, however, lower density LDPE resins have been unsuitable for many commercial applications because foams produced therefrom have not had sufficient stiffness. In accordance with the practice of the present invention, this deficiency has been overcome such that it is now possible to obtain a foam stiffness with low density LDPE resin that compares favorably with foam made with higher density LDPE resin. Specifically, the inventors have found that by orienting the foam at a draw ratio of between 1 and 1.5 and employing a foaming temperature ranging from 0.5 to about 2° F. higher than the crystallization temperature of the foamable blowing agent/polymer mixture, a high stiffness foam can be obtained with the economic and processing benefits of low density LDPE resin.

This is shown in the foregoing examples by comparing Example 1, with Examples 2 and 3. The foams produced in Example 1 were made with a higher density LDPE resin having a density of 0.925 g/cc while the foams of Examples 2 and 3 were made with lower density LDPE resin having a density of 0.919 g/cc. The density difference of 0.006 g/cc was significant in terms of processing energy (temperature and power) and processing difficulty, with the lower density resin requiring less energy and being easier to process. At the same time, the stiffness of the foams was favorably comparable when the foaming temperature was less than 2° F. higher than the crystallization temperature of the foamable blowing agent/polymer mixture. This is demonstrated by comparing Example 1, Run 2 with Example 2 and by comparing Example 1, Run 3 with Example 3, both pairs of foams having similar orientation ratios. For convenience of comparison, the relevant excerpts from Tables 1, 3, and 4 are combined in Table 7 below:

TABLE 7

| Example | Foaming Temp. (° F.) | Extrusion Rate (ER), fpm | Take-off Rate (TR), fpm | Draw Ratio = TR/ER | Flexural Modulus (psi) | % Increase in Stiffness |
|---|---|---|---|---|---|---|
| Example 1, Run #2 (0.925 g/cc) | 238.1 | 13.5 | 17.25 | 1.28 | 407 | 33% |
| Example 2 (0.919 g/cc) | 231.5 | 15.8 | 19.1 | 1.21 | 394.9 | 42% |
| Example 1, Run #3 (0.925 g/cc) | 238.1 | 13.5 | 20 | 1.48 | 445 | 45.4% |
| Example 3 (0.919 g/cc) | 234.6 | 10.5 | 15.3 | 1.46 | 352 | 33% |

The flexural modulus of Example 2, with a slightly lower draw ratio, was slightly less than that of Example 1, Run 2, having a higher density LDPE resin. Note that the unstretched foam of Example 2 was much lower than that of Example 1 (276.9 psi vs. 306 psi) and yet, at a draw ratio of 1.21, increased in stiffness to almost the same level as the foam of Example 1, Run 2 having an orientation ratio of 1.28. The relatively large increase in stiffness of a low density LDPE foam (42%) in comparison to the stiffness increase of a higher density LDPE foam (33%) for a given level of orientation, was unexpected, and advantageously allows lower density LDPE resins to supplant harder-to-process higher density LDPE resins when making foams in accordance with the present invention without sacrificing stiffness.

In comparing the results of Example 1, Run 3 with Example 3, one can discern that the stiffness of the latter foam is inferior to the former foam. The reason for this is due to the fact the foam of Example 3 was formed at a foaming temperature of 234.6° F., which is 4.6° F. higher than the crystallization temperature (230° F.) of the lower density LDPE foamable polymer mixture of Example 3. This is outside the preferred range of 0.5 to 2° F. higher than the crystallization temperature. Thus, the foam of Example 3 was not oriented to the same extent as the foam of Example 2, which was foamed at 1.5° F. higher than the crystallization temperature of its polymer mixture (the same crystallization temp. as Example 3). As a result, the stiffness of the foam of Example 3 did not increase sufficiently to bring it to the stiffness level of the foam of Example 1, Run 3, made with a higher density LDPE resin, at a similar level of orientation (1.46 and 1.48 draw ratio, respectively). Thus, while the foam of Example 3 was commercially acceptable for may applications, it would not be a good substitute for foams made with higher density LDPE resin for applications requiring a high degree of stiffness. The foam of Example 2, on the other hand, would be an excellent substitute in high stiffness applications.

Accordingly, an optimum foam in accordance with present invention is formed from a foamable mixture comprising polyethylene having a density of less than about 0.921 g/cc, has an orientation ratio between 1 and 1.5, and is foamed at a temperature ranging from about 0.5 to about 2° F. above the crystallization temperature of the foamable mixture. Such a foam provides excellent stiffness and minimal thickness variation, along with the economic and processing advantages of a lower density LDPE resin.

While the invention has been described with reference to illustrative examples, those skilled in the art will understand that various modifications may be made to the invention as described without departing from the scope of the claims which follow.

What is claimed is:

1. A method for making an oriented foam, comprising the steps of:

a. blending molten polyethylene and a blowing agent to form a foamable mixture;

b. producing a foam by extruding said mixture at a predetermined rate through a die and into a region of reduced pressure so that said blowing agent expands within said mixture, said mixture being at a temperature ranging from about 0.5 to about 2° F. above the crystallization temperature of said mixture as it is extruded through said die; and c. orienting said foam by drawing said foam out of said die at a rate that is between 1.1 and 1.45 times greater than said predetermined rate at which said mixture is extruded, whereby, said foam has less than 5% variation in thickness.

2. The method of claim 1, wherein said polyethylene comprises at least one member selected from the group consisting of low density polyethylene, high density polyethylene, and ethylene/alpha-olefin copolymer.

3. The method of claim 2, wherein said polyethylene comprises low density polyethylene.

4. The method of claim 1, wherein said oriented foam is a foam sheet having a thickness ranging from about 0.5 to about 10 centimeters.

5. The method of claim 4, wherein said foam sheet has a thickness dimension and has less than 5% variation said thickness dimension.

6. The method of claim 1, wherein said oriented foam is a foam sheet having a width ranging from about 10 to about 125 centimeters.

7. The method of claim 1, wherein said oriented foam has a density ranging from about 10 to about 160 kg/m$^3$.

8. The method of claim 1, wherein said foam is drawn from said die at a rate that is between 1.15 and 1.35 times greater than said predetermined rate.

9. The method of claim 1, wherein said polyethylene has a density of less than about 0.921 g/cc.

10. The method of claim 1, wherein said oriented foam has a flexural modulus greater than about 350 psi.

11. An oriented foam sheet produced by the method of claim 1.

* * * * *